United States Patent
Stefanoni

(10) Patent No.: US 9,314,130 B2
(45) Date of Patent: Apr. 19, 2016

(54) MACHINE FOR DISPENSING INFUSIONS

(75) Inventor: Roberto Stefanoni, Oggiono LC (IT)

(73) Assignee: IMPER S.P.A., Garbagnate Milanese (MI) (IT)

( * ) Notice: Subject to any disclaimer, the term of this patent is extended or adjusted under 35 U.S.C. 154(b) by 288 days.

(21) Appl. No.: 14/003,222

(22) PCT Filed: Mar. 9, 2011

(86) PCT No.: PCT/IT2011/000063
§ 371 (c)(1),
(2), (4) Date: Sep. 4, 2013

(87) PCT Pub. No.: WO2012/120549
PCT Pub. Date: Sep. 13, 2012

(65) Prior Publication Data
US 2013/0340627 A1    Dec. 26, 2013

(51) Int. Cl.
A47J 31/06    (2006.01)
A47J 31/40    (2006.01)
A47J 31/36    (2006.01)

(52) U.S. Cl.
CPC ............ *A47J 31/407* (2013.01); *A47J 31/3633* (2013.01); *A47J 31/3638* (2013.01)

(58) Field of Classification Search
CPC .. A47J 31/3633; A47J 31/3638; A47J 31/407
USPC ......... 99/295, 275, 279, 316, 318, 323, 323.3
See application file for complete search history.

(56) References Cited

U.S. PATENT DOCUMENTS

| | | | | |
|---|---|---|---|---|
| 3,088,826 A | * | 5/1963 | Renner et al. ................. | 426/394 |
| 7,318,373 B2 | * | 1/2008 | Blanc et al. .................. | 99/302 P |
| 2009/0007794 A1 | | 1/2009 | Cortese | |
| 2010/0011965 A1 | | 1/2010 | Turi | |
| 2011/0000377 A1 | * | 1/2011 | Favre ........................... | 99/289 R |
| 2011/0017072 A1 | * | 1/2011 | Frigeri et al. ................ | 99/289 P |

FOREIGN PATENT DOCUMENTS

| | | |
|---|---|---|
| EP | 1669011 | 6/2006 |
| EP | 2509475 | 9/2012 |
| WO | 2007016977 | 2/2007 |
| WO | 2008075175 | 6/2008 |

OTHER PUBLICATIONS

PCT International Search Report mailed on Sep. 16, 2011 for for PCT/IT2011/000063 filed on Mar. 9, 2011 in the name of IDES Development Company Limited.
PCT Written Opinion mailed on Sep. 16, 2011 for for PCT/IT2011/000063 filed on Mar. 9, 2011 in the name of IDES Development Company Limited.
PCT International Report on Patentability mailed on Sep. 19, 2013 for PCT/IT2011/000063 filed on Mar. 9, 2011 in the name of IMPER S.p. A.

* cited by examiner

*Primary Examiner* — Dana Ross
*Assistant Examiner* — Ket D Dang
(74) *Attorney, Agent, or Firm* — Steinfl & Bruno LLP

(57) ABSTRACT

An infusion unit for use in a machine for dispensing beverages from a single-use capsule is described. The infusion unit has a capsule holder openable into two rotatably connected parts to allow insertion and subsequent ejection of the capsule.

15 Claims, 13 Drawing Sheets

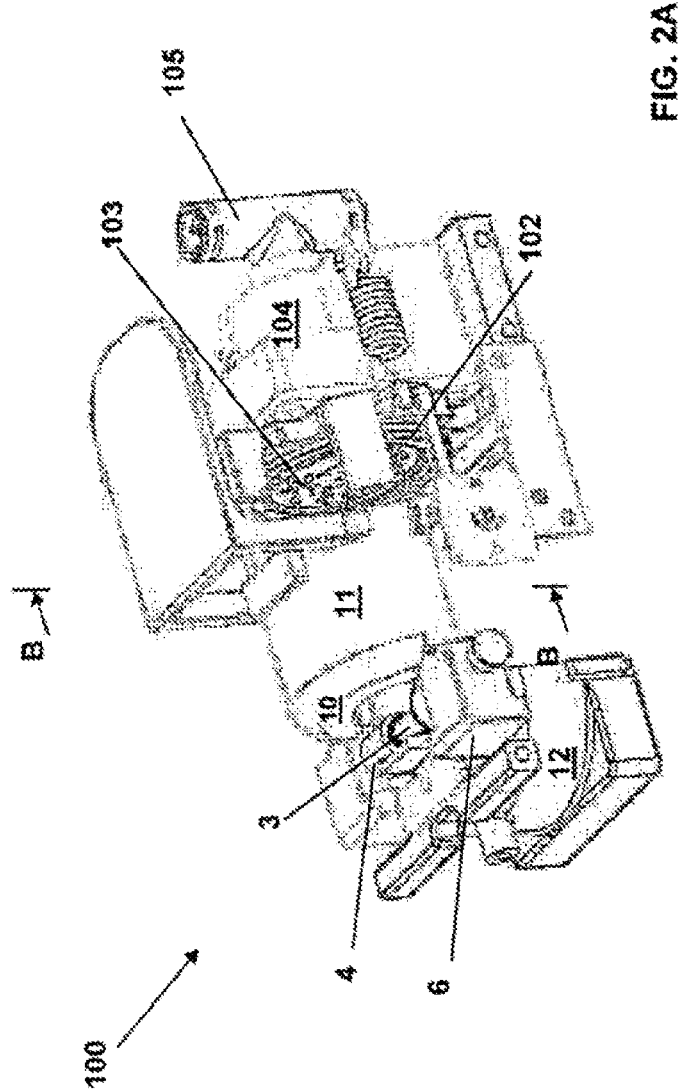

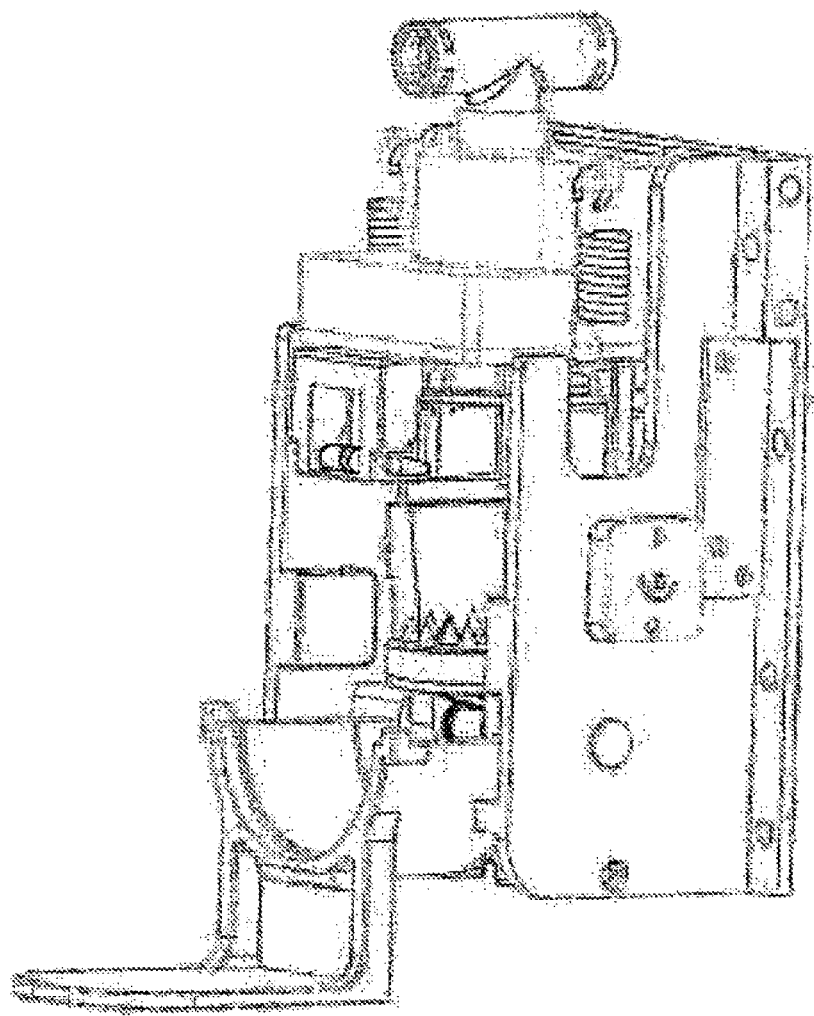

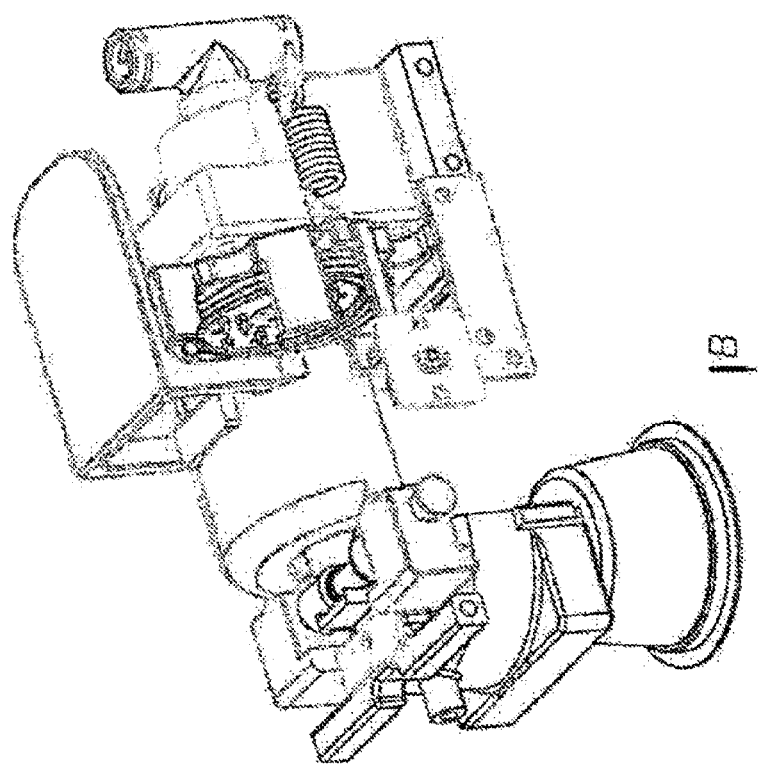

MACHINE FOR DISPENSING INFUSIONS

CROSS REFERENCE TO RELATED APPLICATIONS

The present application is the US national stage of International Patent Application PCT/IT2011/000063 filed on Mar. 9, 2011.

FIELD OF THE INVENTION

The present invention refers to a capsule-holding device for use in a machine for dispensing beverages in the form of infusion extracted from a single-use capsule or pod, in particular e.g. coffee, tea, herb teas and the like.

BACKGROUND OF THE INVENTION

Several designs of machines are known and widespread for extemporarily preparing hot beverages in the form of infusions, e.g. coffee, tea, herb teas and the like, from a single-use and generally single-dose capsule or pod. Such machines are typically located at workplaces and public premises in general, and also versions for household use have spread.

In such machines, the end beverage is obtained through a process of so-called "extraction". Said process consists in having a single-dose pod or capsule containing a product in granular or particle form be passed through by a high-temperature liquid, typically water. The liquid, downstream of such "infusion" through the pod or capsule, makes the desired beverage and is then dispensed to the consumer.

Such extraction and dispensing process is carried out in a dedicated unit of the machine that must be capable of:
  receiving the capsule,
  carrying out the actual infusion,
  ejecting or allowing ejection of the used capsule, and
  getting ready to receive a new capsule.

This operation sequence is typically performed automatically, through mechanisms controlled in a coordinated way to:
  selectively bring an infusion head near to a capsule holder,
  cause dispensing of the liquid through the capsule by the infusion head,
  remove the infusion head from the capsule holder, and
  move the capsule holder so as to cause ejection of the used capsule and its repositioning in an arrangement for receiving a new capsule.

The configuration in which the capsule holder is in a position for receiving a new capsule, and that in which this causes the ejection of a used capsule, are generally referred to as "armed configuration" and "disarmed configuration", respectively.

Main Drawbacks of the Known Art

The above-mentioned known-art machines for dispensing infused beverages entail some relevant drawbacks.

In particular, the mechanisms causing the sequence of coordinated operations through which the capsule holder goes from the armed configuration to the disarmed one are rather complex, as well as rather complex is the set of motions required to the capsule holder itself.

Moreover, known systems for moving the infusion head are based on leverisms whose operation is generally very burdensome in terms of forces required.

SUMMARY OF THE INVENTION

On the basis of what has been set forth in the preceding section, the technical problem set and solved by the present invention is that of providing a capsule-holding device and a related infusion unit for use in a machine for dispensing beverages from a single-use capsule or pod allowing to overcome the drawbacks mentioned above with reference to the known art.

The present invention provides some relevant advantages. The main advantage lies in the fact that the openability of the capsule-holding body allows a drastic structural and functional simplification of the known machines, to the advantage of their reliability. This structural and functional simplification entails also a relevant reduction of dispensing times, and therefore of waiting times between a beverage and the next one.

Moreover, the system requires lower force levels in order to be actuated.

Preferred features of the present invention are set forth in the dependent claims thereof.

In the present context, the term "capsule" is to be understood in its most general meaning, encompassing pods or any receptacle or portion of single-use, or even plural-use particle infusion.

Other advantages, features and operation steps of the present invention will be made apparent in the following detailed description of some embodiments thereof, given by way of example and not for limitative purposes.

BRIEF DESCRIPTION OF THE DRAWINGS

Reference will be made to the figures of the annexed drawings, wherein:

FIGS. 2A, 2B and 2C refer to a first open configuration of the capsule-holding device of FIG. 1A just after ejection of a capsule, showing respectively a side perspective view, a cross-sectional view and a longitudinal sectional view of an infusion unit comprising said capsule-holding device, where for greater clarity in FIG. 2A the depiction of a frame of said infusion unit has been omitted;

FIGS. 3A, 3B and 3C refer to a second open configuration of the capsule-holding device of FIG. 1B, in which the latter is ready to receive a new capsule, showing respectively a side perspective view, a cross-sectional view and a longitudinal sectional view of the infusion unit of FIGS. 2A-2C;

FIGS. 7A, 7B and 7C refer again to the first open configuration of the capsule-holding device of FIG. 1F, showing respectively a side perspective view, a cross-sectional view and a longitudinal sectional view of the infusion unit of FIGS. 2A-2C during a step of ejecting the capsule used in the preceding infusing step.

DETAILED DESCRIPTION OF PREFERRED EMBODIMENTS

Figure 1A:
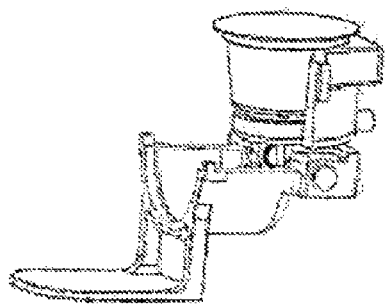
FIGS. 1A to 1F show each a perspective view of a capsule-holding device according to a preferred embodiment of the present invention, each in a respective configuration of its operating cycle.
Figure 1B:
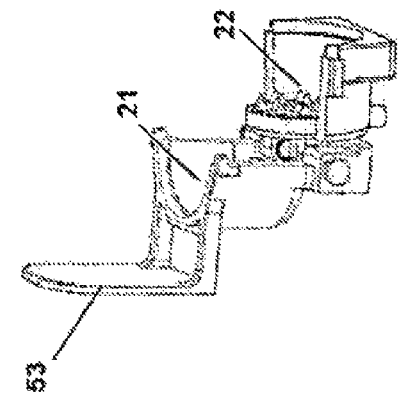
Figure 1C:
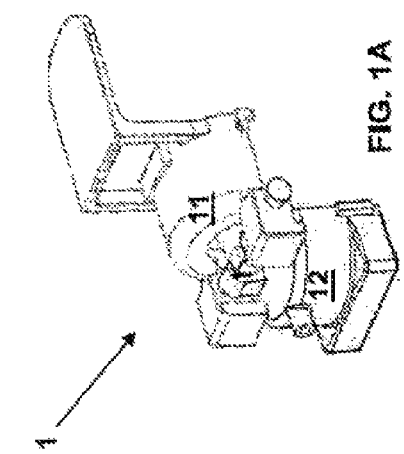
Figure 1D:
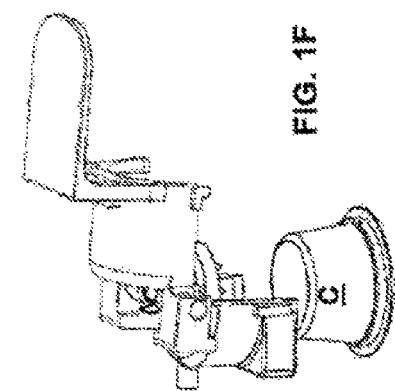
Figure 1E:
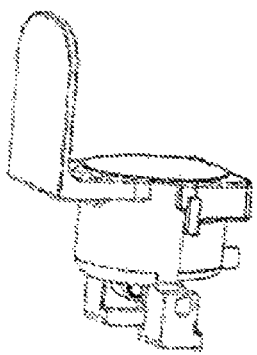
Figure 1F:
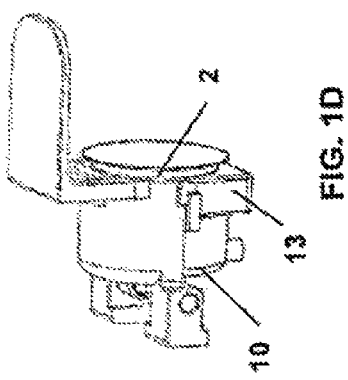

Referring initially to FIGS. 1A-1F, a capsule-holding device according to a preferred embodiment of the invention is generally denoted by 1. Hereinafter, for simplicity's sake said device 1 will be referred to as capsule holder.

The capsule holder 1 is suitable for use in an infusion unit of a machine for dispensing infused beverages extracted from single-use capsules, in particular e.g. coffee, tea, herb teas and the like. Such infusion unit, which will be discussed hereinafter, is shown in the other figures and generally denoted by 100.

The capsule holder 1 comprises a main body which is apt to define a receptacle or housing seat 2 of a capsule C. The receptacle 2 is substantially in the form of a cup or anyhow of suitable convex shape. Moreover, in the present example the capsule holder 1 and the related capsule seat 2 have a substantially cylindrical geometry.

According to the invention, the main body of the capsule holder 1 is formed by a first part 11 and a second part 12 connected or connectible in use and movable the one with respect to the other. Each of the two parts 11 and 12 defines a respective capsule semi-seat 21, 22 complementary to that defined by the other one.

In the present example, the two parts 11 and 12 are at least partially substantially symmetrical the one with respect to the other.

Always in the present example, the above-mentioned connection between the two parts 11 and 12 is of rotatable type and obtained in correspondence of respective bottom portions 10 of the parts 11 and 12. In particular, said rotatable connection provides the coupling of a pin 3 integral to the first part 11 with a respective seat 4 integral to the second part 12. Moreover, on said pin 3 at least one elastic opposing means 5 is mounted, in particular one or two helical torsion springs or an equivalent means, equipped with a pair of abutment arms, respectively 51 and 52. The latter, in selected arrangements of the capsule holder 1, are apt to abut, in use, respectively on the first and on the second part, 11 and 12.

In a variant embodiment, the two portions 21 and 22 may be adjoined by a connecting cam, allowing relative paths even different from the circumferential one.

Moreover, integrally to the pin 3 and in general to the first part 11, an actuating lever 53 or equivalent means is provided for actuating the relative and absolute motion of the two parts 11 and 12.

Figure 6A:
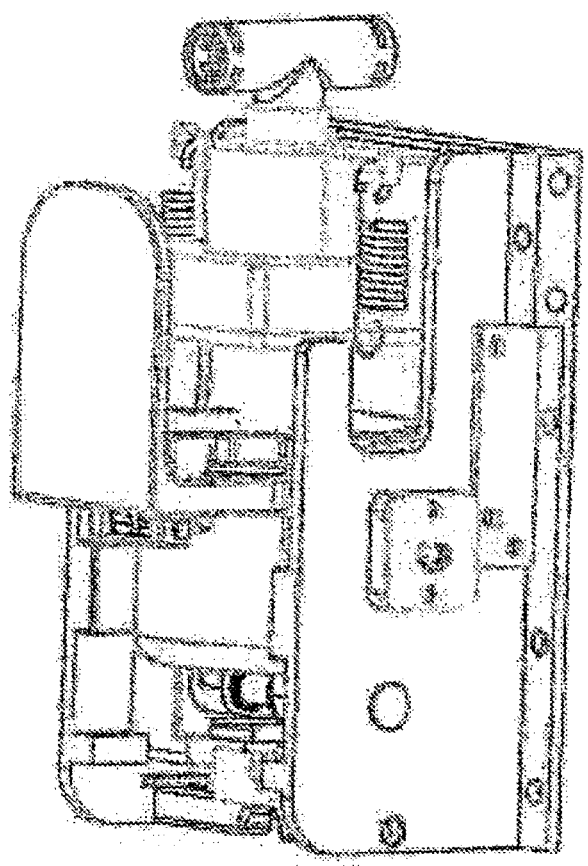
FIGS. 6A, 6B and 6C refer to the above-mentioned closed configuration of the capsule-holding device of FIG. 1E, showing respectively a side perspective view, a cross-sectional view and a longitudinal sectional view of the infusion unit of FIGS. 2A-2C during the step of infusing the beverage.
Figure 6C:
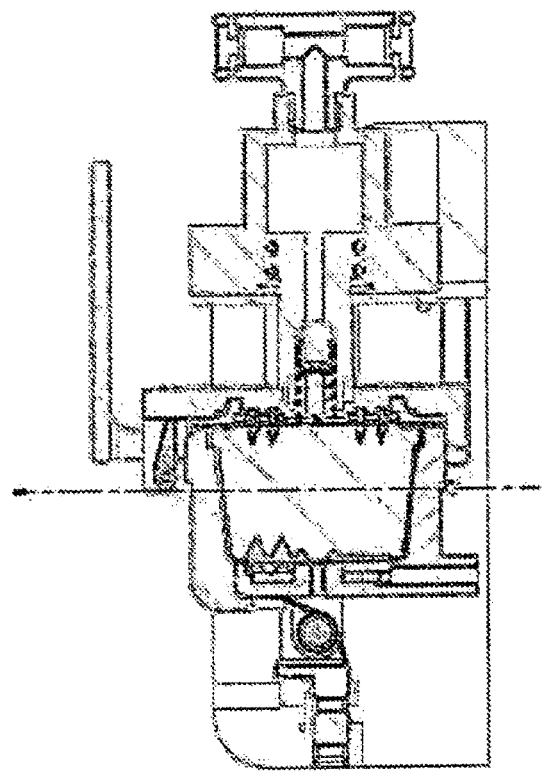

As it will be illustrated in detail hereinafter with reference to the operation modes of the capsule holder 1 and the infusion unit 100, the mutual movability of the two parts 11 and 12 of the capsule holder 1 enables the latter to assume an open configuration—shown e.g. in FIGS. 3C and 7C—in which such parts 11 and 12 are spaced apart to allow insertion and/or ejection of the capsule C, and a closed configuration—shown e.g. in FIG. 6C—in which such parts 11 and 12 are brought near to define the above-mentioned seat 2 for receiving the capsule C, so as to allow beverage extraction.

Figure 3C:
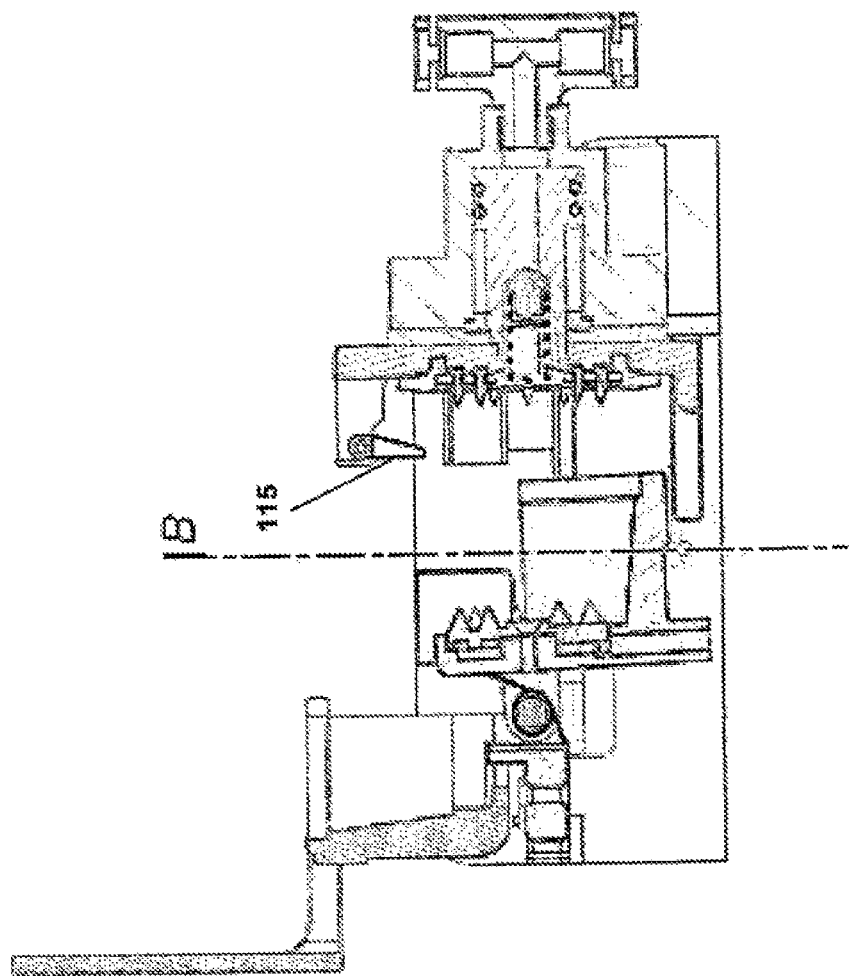
Figure 4A:
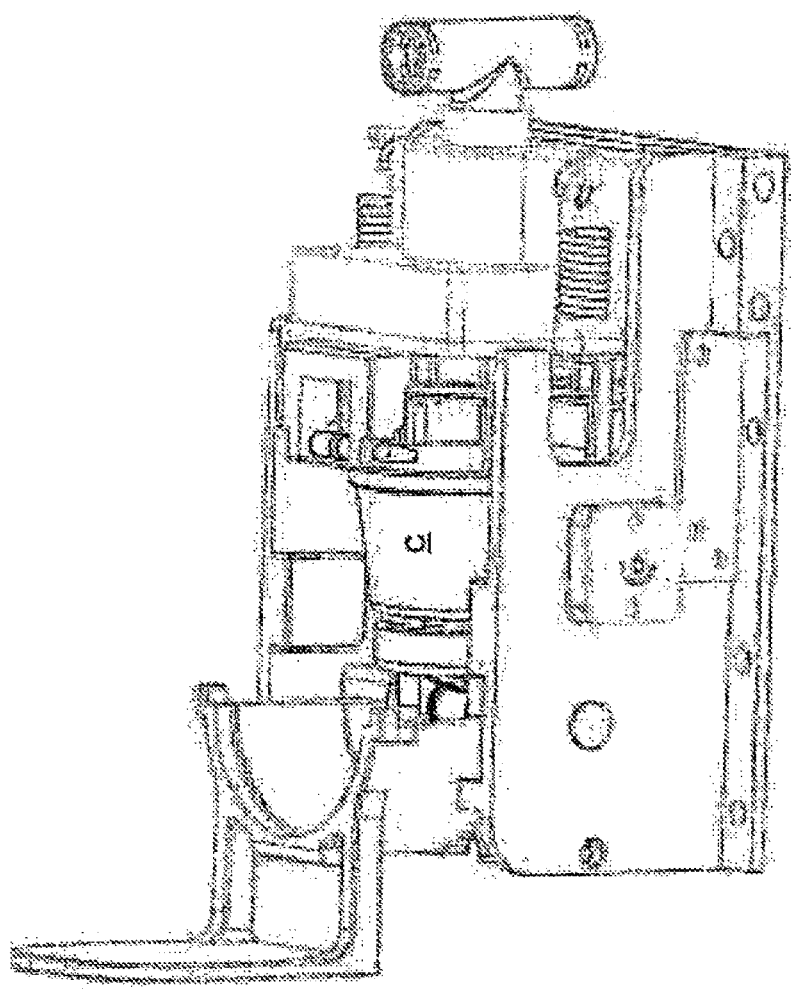
FIGS. 4A, 4B and 4C refer to the above-mentioned second open configuration of the capsule-holding device of FIG. 1C in which the latter receives a new capsule, showing respectively a side perspective view, a cross-sectional view and a longitudinal sectional view of the infusion unit of FIGS. 2A-2C.
Figure 4C:
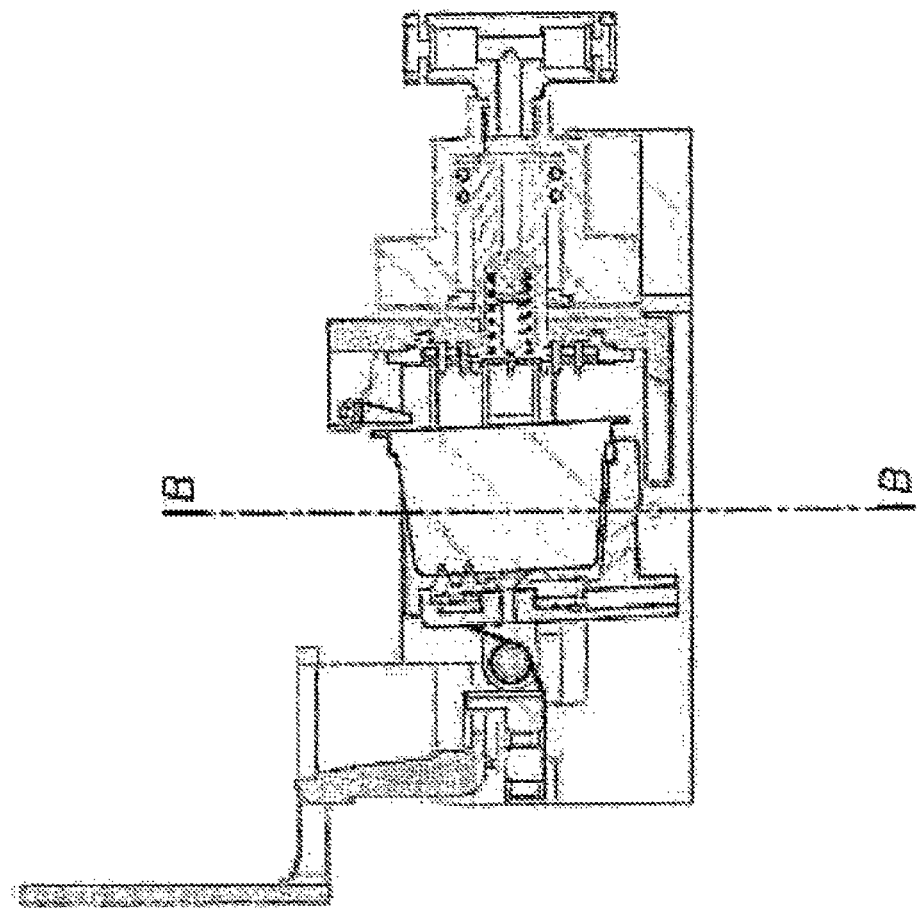
Figure 4B:
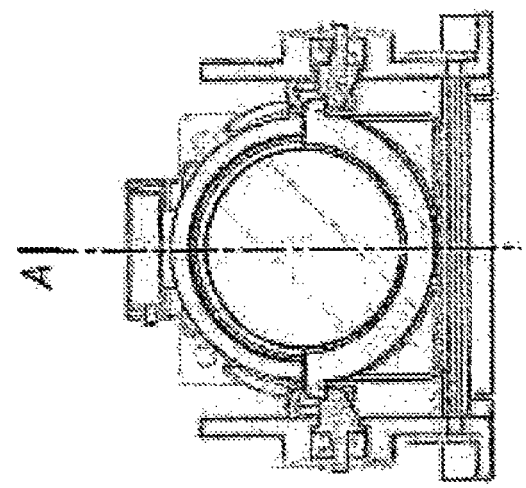
Figure 7C:
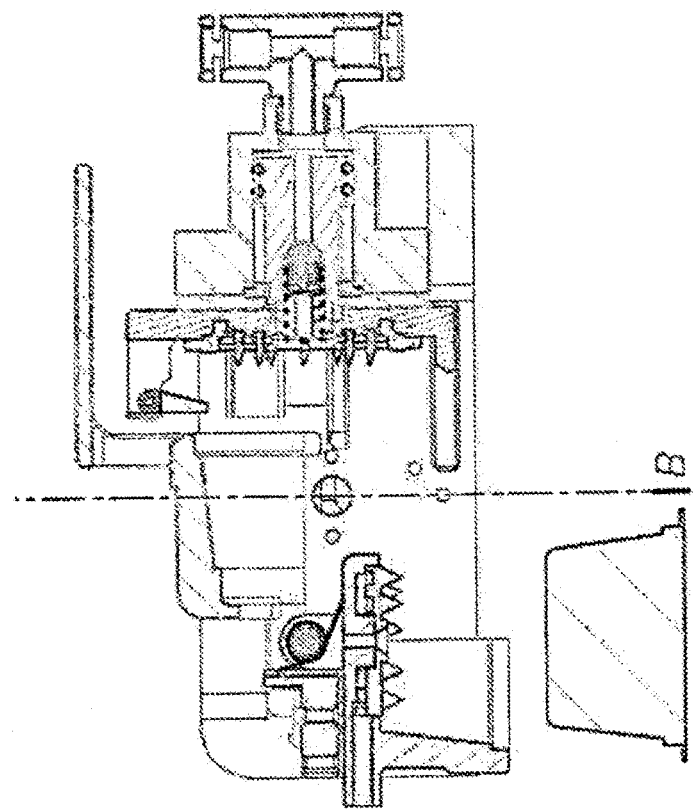
Figure 7B:
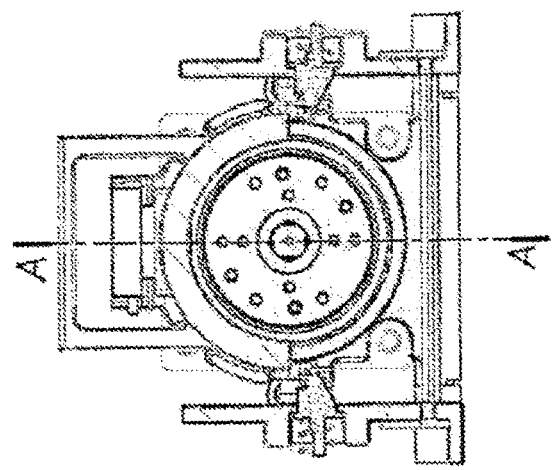

More specifically, in the present example the capsule holder 1 can assume, in use, two distinct open configurations, and in particular:

a first open configuration of inserting the capsule C, shown e.g. in FIGS. 3C and 4C, in which the first part 11 is rotated upward with respect to the second part 12, and a second open configuration of ejecting the capsule C, distinct from the open configuration of inserting and shown e.g. in FIG. 7C, in which the second part 12 is rotated downward with respect to the first part 11.

In the present example, in the above-mentioned open configurations the parts 11 and 12 are rotated of about 90 degrees the one with respect to the other.

Advantageously—and to the ends of a coordinated motion of the two parts 11 and 12—it is provided that the first part 11 comprises means for engaging the second part 12. In the present example, such engaging means is a pair of shaped side arms 6 integral with the first part 11 in correspondence of a first end thereof and apt to abut on the bottom of the second part 12 in correspondence of the other end when the capsule holder 1 is in the open configuration of which at FIG. 2C or 7C.

As it will be illustrated in greater detail hereinafter with reference to the operation modes of the capsule holder 1 and the infusion unit 100, the arms 6 are apt to define an end-of-stroke means in the relative motion of the two parts 11 and 12 and to cause an integral motion of the second part 12 with the first part 11 in a selected arrangement, corresponding in the present example to that of FIG. 2C, in which the second part 12 has just ejected a used pod.

Moreover, the second part 12 of the capsule holder 1 has a retaining means, which in the present example is in the form of a projecting peripheral edge 13 arranged in correspondence of the mouth of the semi-seat 22.

Figure 2C:
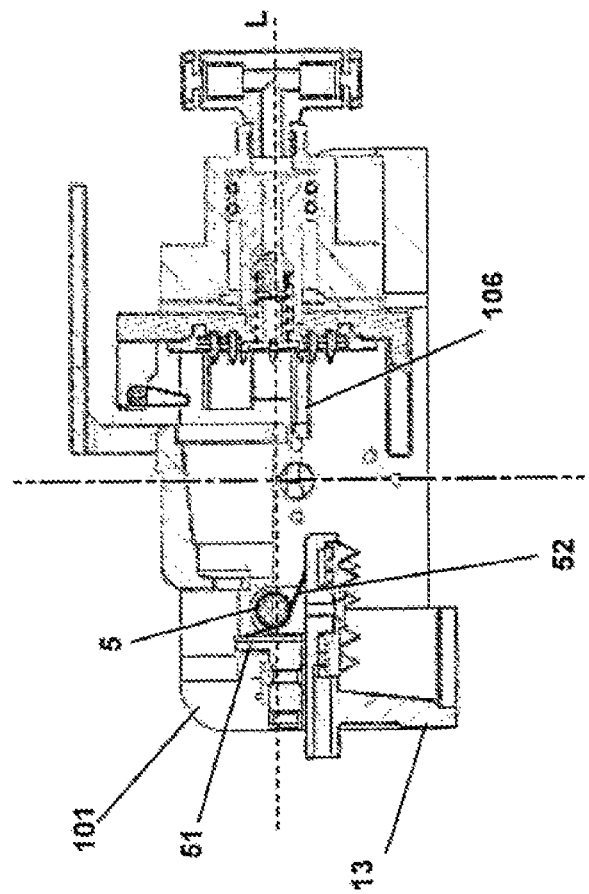
Figure 2B:
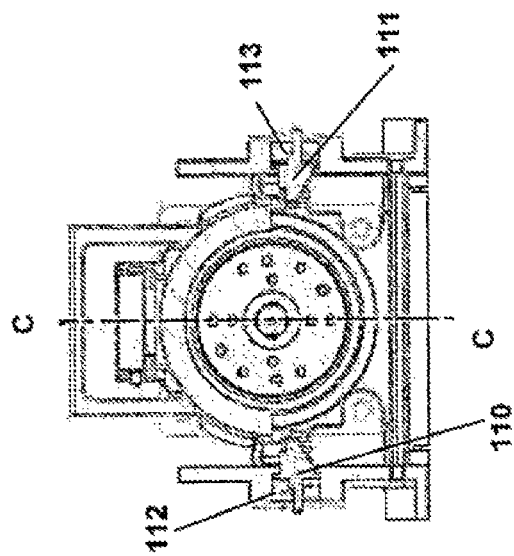

Referring now to FIGS. 2A, 2B and 2C, the infusion unit 100 mainly comprises a frame 101 receiving the capsule holder 1 and an infusion head 102, the latter selectively movable with respect to the frame 101 and to the capsule holder 1 and apt to cooperate with the latter for beverage extraction.

Means for blocking or retaining the capsule holder 1 in the above-mentioned closed configuration is mounted on the frame 101. In the present example such blocking means is of snap type. In particular, it comprises a pair of shaped engagement arms or pins, respectively 110 and 111, associated to respective opposing means 112 and 113 and arranged in correspondence of a side skirt of the frame 101. In the present example, the opposing means 112 and 113 are helical compression springs arranged around the body of the respective arms 110 and 111 so as to force them into an advanced blocking position in which they project inside the frame 101.

The shaped arms 110 and 111 are apt to engage the peripheral edge 13 of the second part 12 of the capsule holder 1 to the ends of said retaining in a closed configuration.

Preferably, in said blocking arrangement by means of the arms 110 and 111 and of the associated opposing means 112 and 113 the capsule holder 1 is kept tilted with respect to a longitudinal axis L of the frame 101, in particular slightly raised with respect to the latter, i.e. on the side of the actuating lever arm 53. The tilt is preferably comprised in a range of about 2-5 degrees, and even more preferably in a range of about 2-3 degrees.

As it will be illustrated hereinafter, the above-mentioned blocking means 110-113 are selectively disengageable from the edge 13 of the capsule holder 1 by means of the infusion head 102, during the motion of the latter toward the capsule holder 1.

In fact, like in some known systems, the infusion head 102 is provided with translatory motion along the above-mentioned longitudinal axis L of the frame 101, substantially corresponding to an axis of longitudinal symmetry of the head 102.

The infusion head 102 has a plurality of nozzles or channels 103 for dispensing an extraction fluid, typically water, and is housed into a cylindrical body 104 apt to allow sliding and stationary motion thereof with the frame 101. Moreover, the head 102 is in communication with related means 105 for feeding the fluid, arranged upstream of the cylindrical body 104. Since those latter components are per se well known to a person skilled in the art, a further description thereof will be omitted.

The infusion head 102 further comprises means for releasing the arms or pins 110 and 111, apt to cause disengagement by the latter of the edge 13 of the second part 13 of the capsule holder 1. In the present example, such releasing means comprises a pair of side arms 106, or a side skirt, of the head 102 itself, apt to interfere with said arms or pins 110 and 111 during the motion of advancement of the head 102 toward the capsule holder 1.

To the head 102 there can also be associated elastic opposing means, arranged in various locations and apt to connect the same head 102 with the frame 101. Since also this arrangement of elastic means is per se known and anyhow it is not an object of the present invention, a further description thereof will be omitted.

The operation modes of the capsule holder 1 and of the infusion unit 100 in which it is inserted are illustrated hereinafter, starting from the above-mentioned first open configuration of the capsule holder 1 in which the capsule C has just been ejected, configuration shown in FIGS. 2A-2C.

In this configuration and in the exemplary arrangement shown in the figures, the second part 12 of the capsule holder 1 is rotated downward, whereas the first part 11 is substantially aligned to the frame 101 along axis L. Likewise, the actuating arm 53 is arranged substantially parallel to said axis L.

Always in said configuration, the infusion head 102 is in a position retracted and spaced apart from the capsule holder 1, and in fact is completing its own return stroke in which it moves away just from the capsule holder 1. Such return stroke is obtained by the action of the above-mentioned elastic means connecting the head 102 to the frame 101.

Figure 3B:
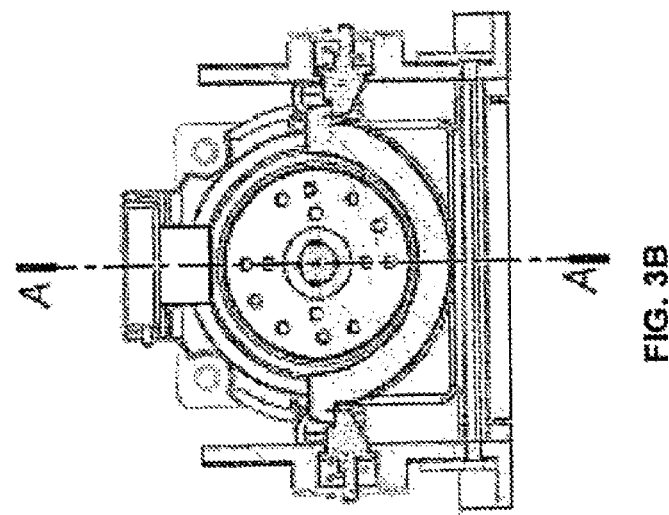

To the ends of a new dispensing of beverage, a user can actuate the actuating arm 53 by raising it in a position substantially orthogonal to axis L, as shown in FIGS. 3A-3C. This actuation may be direct, i.e. manual, or carried out by suitable control means for controlling the dispensing machine in which the infusion unit 100 is mounted.

The actuation, in the above-mentioned way, of the arm 53 integral to the first part 11 entails a corresponding rotation of the latter. The shaped arms 6 and the action of the opposing means 5 which associates the motions of the first and second part 11 and 12 of the capsule holder 1 cause a corresponding rotation of the second part 12, which arranges itself in a position almost aligned with axis L of the frame 101.

In this second open configuration of the capsule holder 1, a capsule C can be inserted into the semi-seat 22 defined by the second part 12 thereof, as shown in FIG. 4C. As seen in FIGS. 3C and 4C, the arrangement of the blocking means 110-113 is such that they engage the edge 13 of the second part 12 of the capsule holder 1, holding it in an arrangement slightly tilted with respect to axis L, as already mentioned above.

Preferably, a retaining element 115 is provided, hinged on the infusion head 102 and apt to ensure a keeping in position of the capsule C into the semi-seat 22, and in particular to prevent the upturning of the capsule C on the infusion head 102 before it has completed its forward stroke.

Figure 5A:
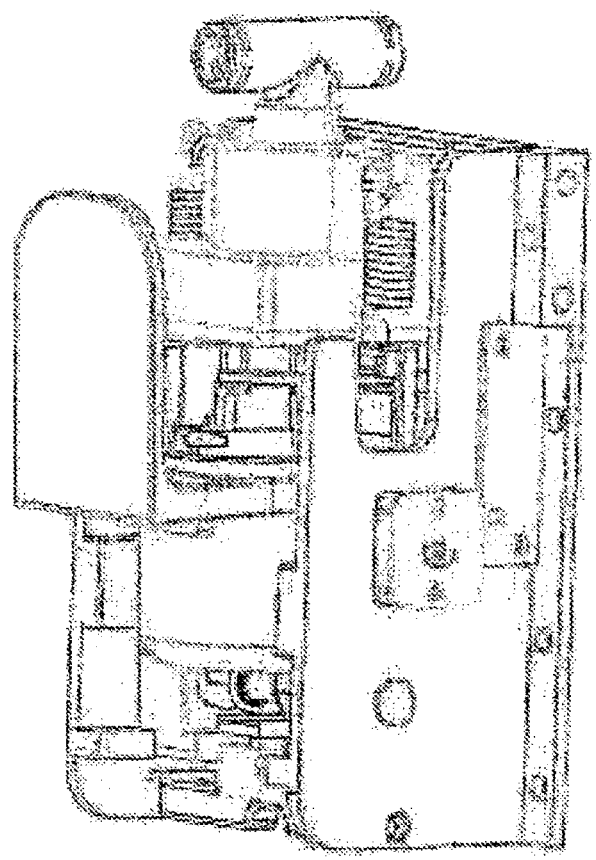
FIGS. 5A, 5B and 5C refer to a closed configuration of the capsule-holding device of FIG. 1D, showing respectively a side perspective view, a cross-sectional view and a longitudinal sectional view of the infusion unit of FIGS. 2A-2C immediately prior to a step of infusing the beverage.
Figure 5C:
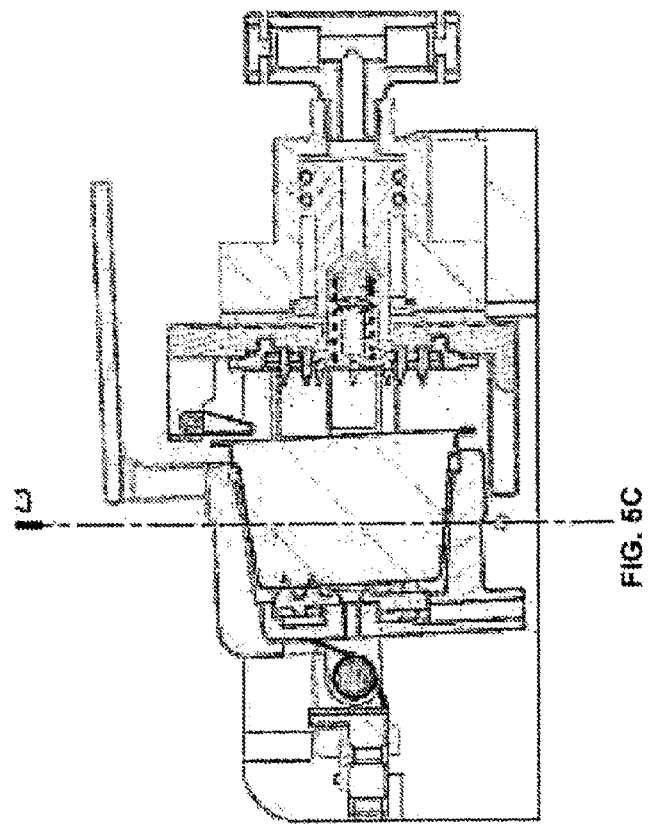
Figure 5B:
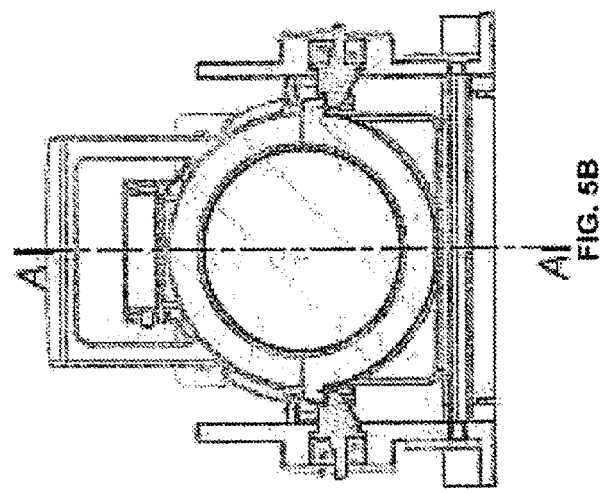
Figure 6B:
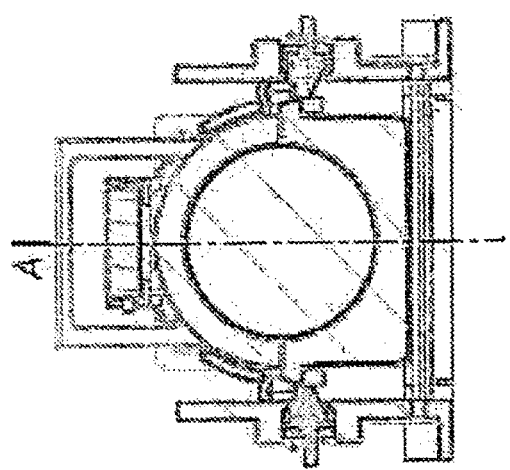

Then, as shown in FIGS. 5A-5C, the first part 11 is closed, by actuating the lever 53, on the second part 12, so that the capsule C is completely housed into the seat 2. The infusion head 102 at this stage has begun its own forward stroke, moving near to the capsule holder 1. The interference of the arms 106 with the blocking pins 110 and 111 causes disengagement of the edge 13 by the latter as the infusion head 102 abuts on the capsule holder 1 and can therefore retain it in the closed configuration. Then, as shown in FIGS. 6A-6C, the infusion head 102 feeds hot liquid inside the capsule C, initiating the beverage extracting step.

As the blocking means 110 and 111 are deactivated by the side arms 106, the capsule holder 1 performs a slight rotation, losing the preceding arrangement tilted with respect to axis L and bringing itself substantially in line with the latter.

Upon ending the infusion stage, the head 102 begins its return stroke. As soon as the capsule holder 1 is disengaged, the second part 12, by gravity and under the action of the arm 52 of the opposing means 5, rotates in the lowered position of FIG. 7C, causing the fall by gravity of the capsule C.

It will be understood that though the device of the invention is particularly suitable for use with single-use and/or single-dose capsules, in principle it is also applicable to reusable or plural-use and/or plural-dose capsules.

In a variant embodiment, between the two parts 11 and 12 of which the capsule holder 1 is comprised, a gasket or an equivalent sealing means may be interposed, e.g. integral to one of such two parts, so as to guarantee an effective seal of the beverage and the granular infusion being extracted.

Moreover, according to a further variant embodiment the actuating lever 53—or the actuating means equivalent thereto—may be made so as not to remain anyhow integral to the first part 11, and in particular to the pin 3 thereof, but to be rotatably connected to the latter. More specifically, such actuating lever or means may be articulated on the part 11 so that when, at the step shown in FIGS. 5A-5C immediately preceding the infusion one, the capsule holder 1 is arranged in a position slightly offset with respect to the longitudinal axis L, the above-mentioned actuating lever or means can perform a rotation with respect to the same capsule holder so as to arrange itself parallelly to said axis. Thus, said actuating means is prevented from projecting with respect to the infusion unit as a whole. In other words, to such actuating lever or means a rotary motion range should be allowed of an extent equal to the abovementioned initial offset of the part 12 with respect to the axis L.

The present invention has hereto been described according to preferred embodiments thereof. It is understood that other embodiments might exist, all falling within the concept of the same invention, as defined by the protective scope of the claims hereinafter.

The invention claimed is:

1. An infusion unit configured for use in a machine for dispensing infused beverages extracted from capsules, the infusion unit comprising:
    a capsule-holding device; and
    an infusion head, configured to cooperate with said capsule-holding device for extracting said infused beverages, said infusion head being selectively movable with respect to said capsule-holding device with a translatory motion along a longitudinal axis of a frame of the infusion unit,
    wherein said capsule-holding device comprises a main body, said main body comprising a first part and a second part, each of said first part and said second part defining a respective capsule semi-seat, wherein said first part and said second part are rotatably connected, in use, to each other at respective bottom portions, such that said capsule-holding device is configured to assume:

a first open configuration, wherein said first part and said second part are spaced apart to allow insertion of a capsule of said capsules, a second open configuration distinct from said first open configuration, wherein said first part and said second part are spaced apart to allow ejection of said capsule, and a closed configuration, wherein said first part and said second part are brought close to each other defining a seat for receiving said capsule;

wherein said first open configuration comprises said first part being rotated upwards with respect to said second part, and said second open configuration comprises said second part being rotated downwards with respect to said first part;

wherein, in said closed configuration of said capsule-holding device, said infusion head dispenses an extraction liquid that passes through said capsule.

2. The infusion unit according to claim 1, further comprising a retainer of at least one part of said capsule-holding device in a position corresponding to said closed configuration.

3. The infusion unit according to claim 2, wherein said retainer is selectively deactivatable by said infusion head.

4. The infusion unit according to claim 3, wherein deactivation occurs during a motion bringing said infusion head close to said capsule-holding device.

5. The infusion unit according to claim 2, wherein said retainer is configured to keep said second part of the capsule-holding device in a position tilted with respect to said longitudinal axis of said infusion unit.

6. The infusion unit according to claim 5, wherein said tilt is comprised in a range of about 2-5 degrees.

7. The infusion unit according to claim 1, further comprising a retaining element configured to keep the capsule into the second part of said capsule-holding device when the device is in said first open configuration.

8. The infusion unit according to claim 1, wherein said first and second parts are at least partially symmetrical with respect to each other.

9. The infusion unit according to claim 1, wherein one of said first part and said second part comprises engaging elements of the other one of said first part and said second part, which engaging elements define an end-of-stroke of a relative motion between said first part and said second part.

10. The infusion unit according to claim 1, wherein one of said first part and said second part comprises engaging elements of the other one of said first part and said second part, wherein the engaging elements cause, in a selected arrangement, an integral motion of the second part together with the first part.

11. The infusion unit according to claim 10, wherein said engaging elements comprise at least one abutment arm.

12. The infusion unit according to claim 1, comprising an actuator for actuating a relative motion of said first part and said second part.

13. The infusion unit according to claim 1, wherein at least one of said first part and said second part comprises a retainer of the corresponding other of said first part and said second part in a position corresponding to said closed configuration.

14. The infusion unit according to claim 13, wherein said retainer is a peripheral edge, arranged at a mouth of said seat for receiving the capsule.

15. The infusion unit according to claim 1, further comprising a sealing element interposed between said first part and said second part.

* * * * *